United States Patent [19]
Suzuki et al.

[11] Patent Number: 5,905,556
[45] Date of Patent: May 18, 1999

[54] IN-PLANE TYPE LIQUID CRYSTAL DISPLAY APPARATUS WITH IMPROVED PICTURE QUALITY

[75] Inventors: Teruaki Suzuki; Shinichi Nishida; Masayoshi Suzuki; Takahiko Watanabe; Makoto Watanabe, all of Tokyo, Japan

[73] Assignee: NEC Corporation, Tokyo, Japan

[21] Appl. No.: 08/893,660

[22] Filed: Jul. 11, 1997

[30] Foreign Application Priority Data

Jul. 11, 1996 [JP] Japan .................................. 8-201125

[51] Int. Cl.⁶ .................................................. G02F 1/1343
[52] U.S. Cl. ............................................ 349/141; 349/144
[58] Field of Search ................................... 349/141, 144, 349/143

[56] References Cited

U.S. PATENT DOCUMENTS

| | | | |
|---|---|---|---|
| 3,807,831 | 4/1974 | Soref | 350/150 |
| 5,598,285 | 1/1997 | Kondo et al. | 349/39 |
| 5,600,464 | 2/1997 | Ohe et al. | 349/138 |
| 5,760,856 | 6/1998 | Yanagawa et al. | 349/42 |

FOREIGN PATENT DOCUMENTS

| | | |
|---|---|---|
| 56-91277 | 6/1981 | Japan . |
| 63-21907 | 5/1988 | Japan . |
| 5-505247 | 8/1993 | Japan . |
| 7-36058 | 2/1995 | Japan . |
| 7-191336 | 7/1995 | Japan . |

*Primary Examiner*—Tiep H. Nguyen
*Attorney, Agent, or Firm*—Sughrue, Mion, Zinn, Macpeak & Seas, PLLC

[57] ABSTRACT

In an in-plane liquid crystal display apparatus including a ladder type source electrode having two first parallel sides and a plurality of first cross-pieces between the first parallel sides, and a ladder type common electrode having two second parallel sides and a plurality of second cross-pieces between the second parallel sides, the ladder type source electrode and the ladder type common electrode define one pixel area divided into a plurality of sub pixel areas. Each of the sub pixel areas is partitioned by one of the first parallel sides, one of the first cross-pieces, one of the second parallel sides and one of the second cross-pieces.

13 Claims, 22 Drawing Sheets

IN-PLANE TYPE LIQUID CRYSTAL DISPLAY APPARATUS WITH IMPROVED PICTURE QUALITY

BACKGROUND OF THE INVENTION

1. Field of the Invention

The present invention relates to an in-plane liquid crystal display (LCD) apparatus.

2. Description of the Related Art

In an in-plane LCD apparatus, liquid crystal is driven by an electric field generated horizontally with respect to substrates.

A first prior art in-plane type LCD apparatus includes a comb-shaped source electrode and a comb-shaped common electrode which are interleaved with each other, thus generating a horizontal electric field therebetween. As a result, liquid crystal molecules are rotated in a certain direction by the horizontal electric field (see U.S. Pat. No. 3,807,831 & JP-A-56-91277). This will be explained later in detail.

In the first prior art LCD however, electric fields generated around the tops and bottoms of the comb-shaped portions of the source electrode and the common electrode are radial. As a result, a torque is applied to some of the liquid crystal molecules in an opposite direction. Therefore, some of the liquid crystal molecules are rotated in an opposite direction, which creates extraordinary domains (dark domains). Also, in this case, since a discrimation or a boundary face is created between the extraordinary domains (dark domains) and the ordinary domains (light domains), such a boundary face cannot be controlled, and therefore, is unstable.

In a second prior art in-plane type LCD apparatus (see JP-A-7-36058), a part of the source electrode and a part of the common electrode are enlarged to suppress the above-mentioned extraordinary domains. This will also be explained later in detail. However, the inventors have found that the second prior art LCD apparatus has never shown a reduction of the extraordinary domains.

In a third prior art in-plane type LCD apparatus (see JP-A-7-36058), a source electrode and a common electrode are both of a ladder type. Also, the source electrode is isolated from the common electrode by an insulating layer. The source electrode is partly superposed onto the common electrode, to increase the capacitance therebetween. As a result, the numerical apperture can be increased, and the voltage retention characteristics can be improved, In addition, short-circuit and disconnection of the source electrode and the common electrode can be avoided, which increases the manufacturing yield. This will also be explained later in detail.

Even in the third prior art LCD apparatus, however, electric fields generated around the edged portions of the source electrode and the common electrode are radial. As a result, some of the liquid crystal molecules are rotated in an opposite direction, which creates extraordinary domains (dark domains).

Also, a fourth prior art in-plane type LCD apparatus improves visible angle characteristics as compared with TN-type LCD apparatuses (see JP-A-5-505247), corresponding to WO 91/10936). However, this fourth prior art in-plane type LCD apparatus has comb-type electrodes to create the above-mentioned extraordinary domains, which degrades the picture quality.

SUMMARY OF THE INVENTION

It is an object of the present invention to provide an in-plane LCD apparatus with a high picture quality.

According to the present invention, in an in-plane liquid crystal display apparatus including a ladder type source electrode having two first parallel sides and a plurality of first cross-pieces between the first parallel sides, and a ladder type common electrode having two second parallel sides and a plurality of second cross-pieces between the second parallel sides, the ladder type source electrode and the ladder type common electrode define one pixel area divided into a plurality of sub pixel areas. Each of the sub pixel areas is partitioned by one of the first parallel sides, one of the first cross-pieces, one of the second parallel sides and one of the second cross-pieces.

BRIEF DESCRIPTION OF THE DRAWINGS

The present invention will be more clearly understood from the description as set forth below, as compared with the prior art, with reference to the accompanying drawings, wherein.

DESCRIPTION OF THE PREFERRED EMBODIMENTS

Before the description of the preferred embodiments, prior art in-plane type LCD apparatuses will be explained with reference to FIGS. 1, 2A, 2B, 3, 4, 5, 6A through 6H, 7 and 8.

Figure 1:
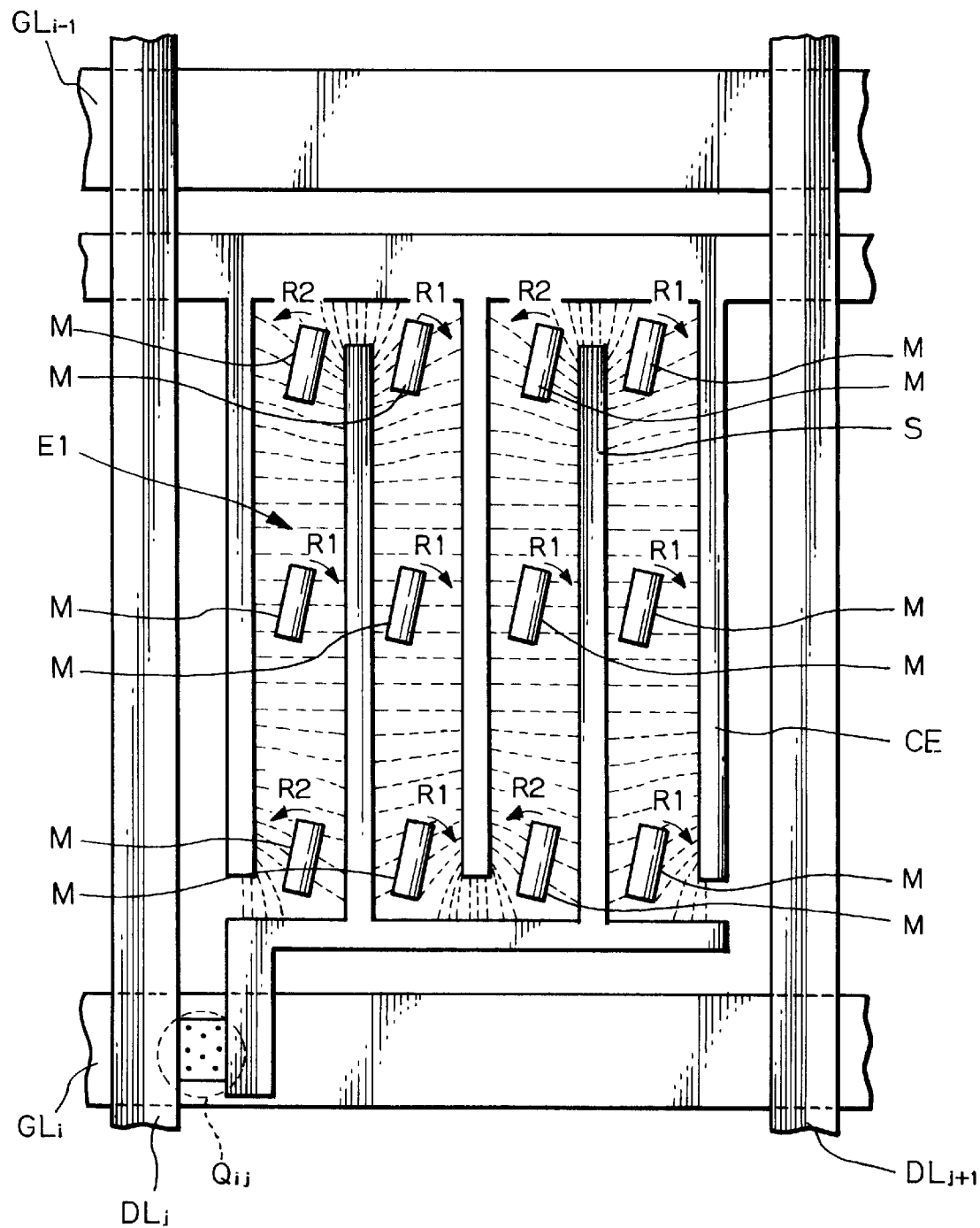
FIG. 1 is a plan view illustrating a first prior art in-plane type LCD apparatus.

In FIG. 1, which illustrates a first prior art in-plane type LCD apparatus (see JP-A-56-91277), a plurality of gate bus lines such as $GL_j$, which are also called scan bus lines, are arranged in parallel with each other. Also, a plurality of drain bus lines such as $DL_j$, which are also called signal bus lines, are arranged in parallel with each other. The drain bus lines are perpendicular to the gate bus lines.

A plurality of thin film transistors (TFTs) such as $Q_{i,j}$ are provided at each intersection between the gate bus lines and the drain bus lines. The TFT $Q_{i,j}$ has a gate electrode connected to the gate bus line $GL_j$, a drain electrode formed by the drain bus line $DL_j$, and a source electrode S. Also, a common electrode CE opposes the source electrode S.

The source electrode S and the common electrode CE are both comb-shaped, and the source electrode S is interleaved with the common electrode CE. Thus, a parasitic capacitance between the common electrode CE and the gate bus lines and a parasitic capacitance between the common electrode CE and the drain bus lines can be reduced.

Figure 2A:
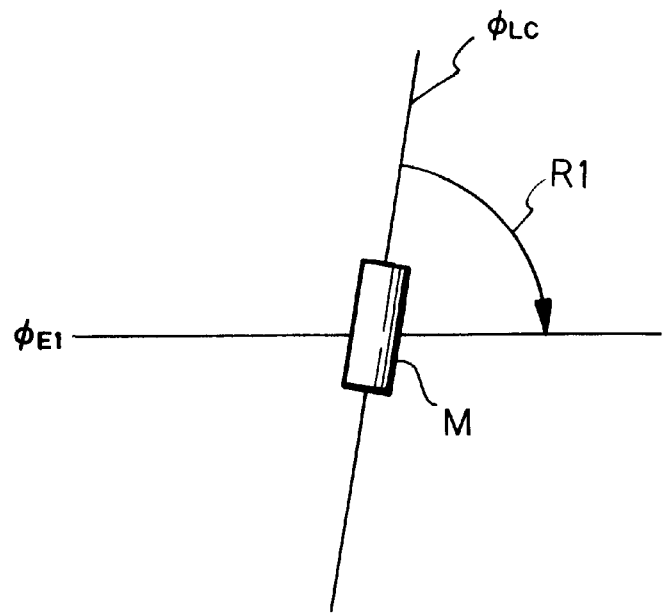
FIGS. 2A and 2B are diagrams for explaining the rotation of the liquid crystal molecules of FIG. 1.
Figure 2B:
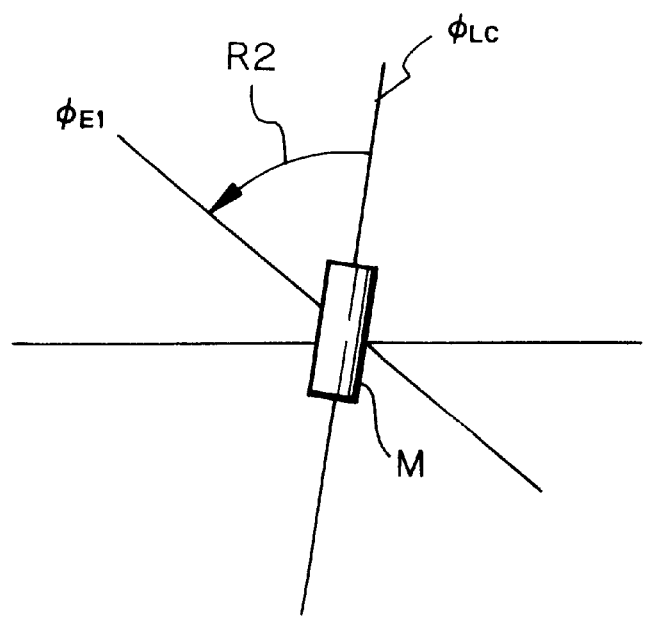

In addition, nematic liquid crystal material having a positive anisotropic dielectric constant, for example, is inserted between two transparent substrates (not shown). In this case, the initial orientation angle $\phi_{LC}$ of liquid crystal molecules M is $45° \leq \phi_{LC} < 90°$. As shown in FIGS. 2A and 2B, note that the orientation angle is defined by the optical axis (longitudinal direction) of the liquid crystal molecules M relative to a direction perpendicular to the comb-shaped portions of the source electrode S and the common electrode CE.

If no voltage is applied between the source electrode S and the common electrode CE, the orientation angle of the liquid crystal molecules M is definite ($=\phi_{LC}$).

On the other hand, when a voltage is applied between the source electrode S and the common electrode CE, an electric field E1 generated perpendicularly to the comb-shaped portions of the source electrode S and the common electrode CE. As a result, a torque is applied to the liquid crystal molecules M, so that the liquid crystal molecules M are forced to be in parallel with the electric field E1. In this case, since the liquid crystal molecules M are anchored at the orientation layers of the substrates, only the center portion of the liquid crystal molecules M apart from the substrates are deformed, i.e., twisted. Also, generally, the direction of the twisted angle of the liquid crystal molecules M is dependent upon the initial orientation thereof, and the amount of the twisted angle is dependent upon the electric field E1. Thus, the liquid crystal molecules M are rotated in a clockwise direction as indicated by R1 in FIG. 1 as well as FIG. 2A.

Thus the absence and presence of an electric field changes the orientation angle $\phi_{LC}$ of the liquid crystal molecules M, so that the polarization plane of incident light is changed by the double refraction characteristics of the liquid crystal material. In this case, the absence of the voltage prohibits transmission of light to realize a dark state. Contrary to this, the presence of the voltage permits transmission of light to realize a light state.

Figure 3:
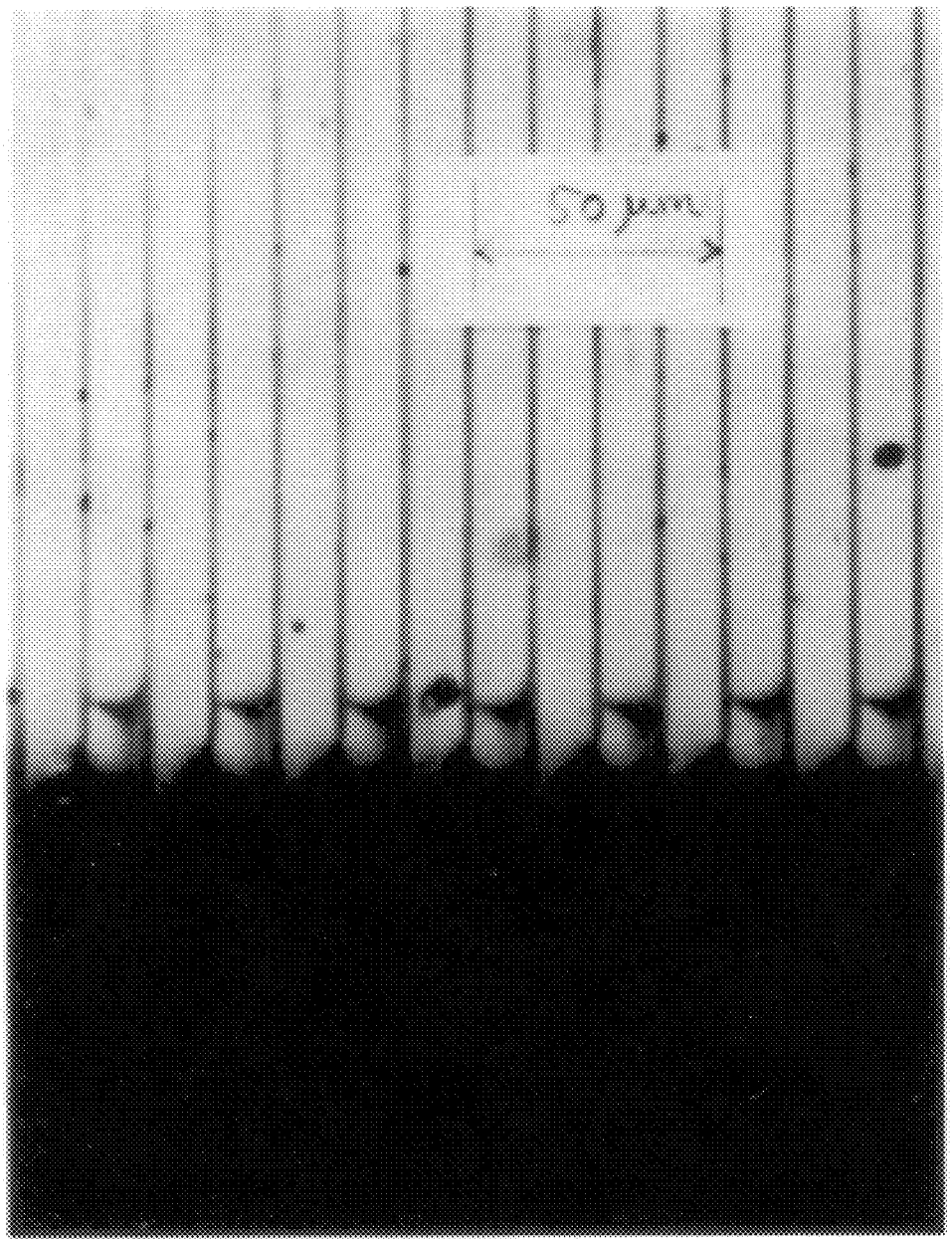
FIGS. 3 and 4 are photographs for showing the generation of extraordinary domains in the apparatus of FIG. 1.

In the apparatus of FIG. 1, however, electric fields generated around the tops and bottoms of the comb-shaped portions of the source electrode S and the common electrode CE are radial. As a result, a torque is performed upon some of the liquid crystal molecules M in a counterclockwise direction. Therefore, some of the liquid crystal molecules M are rotated in a counterclockwise direction as indicated by R2 in FIG. 1 as well as FIG. 2B, which create extraordinary domains (dark domains) as shown in FIG. 3. Also, in this case, since a discrimation or a boundary face is created between the extraordinary domains (dark domains) and the ordinary domains (light domains), such a boundary face cannot be controlled, and therefore, is unstable.

Figure 4:
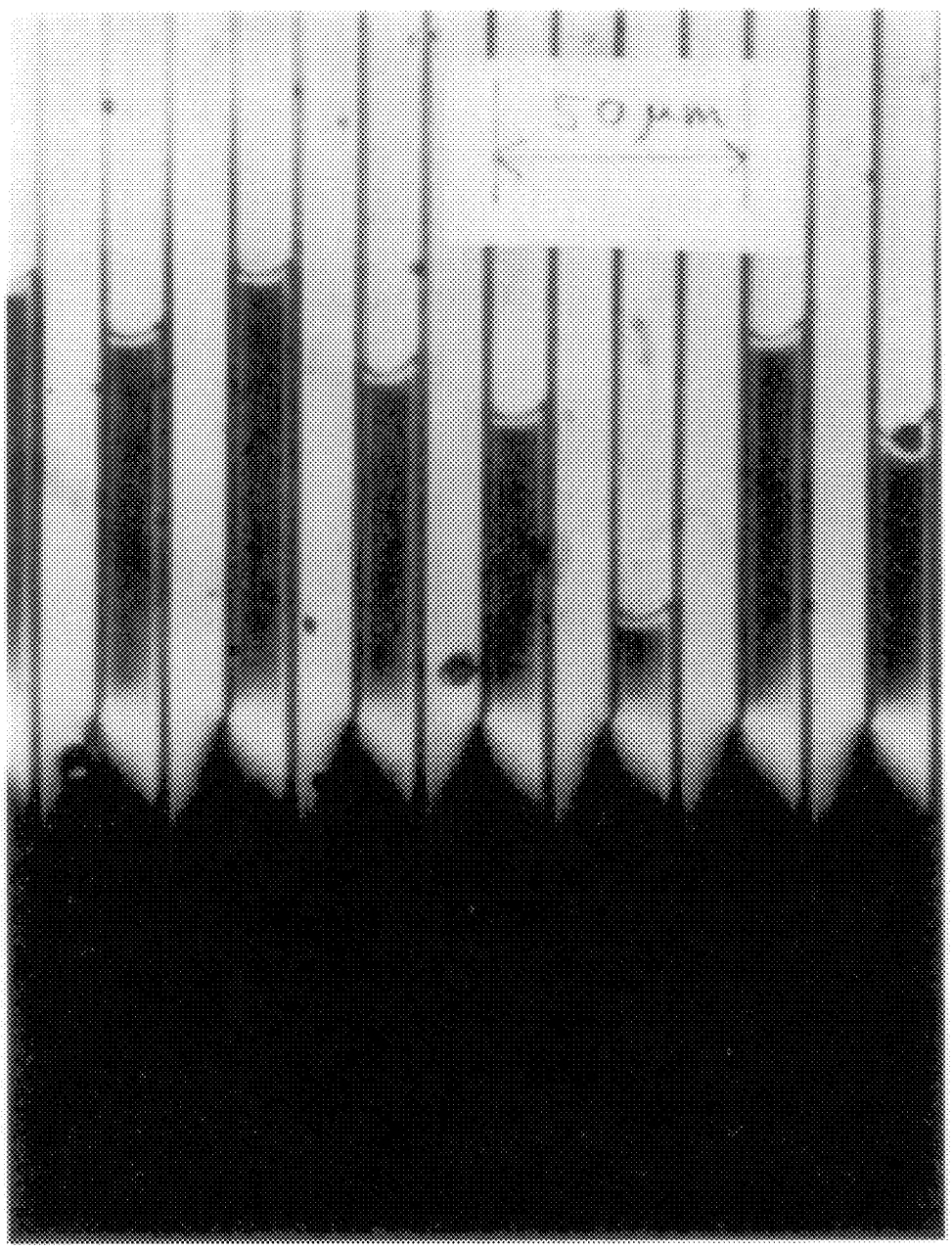

In FIG. 3, a voltage of 5V is applied between the source electrode S and the common electrode CE. If this voltage is further increased to 10V, the extraordinary domains are grown as shown in FIG. 4. Such extraordinary domains degrade the picture quality.

Figure 5:
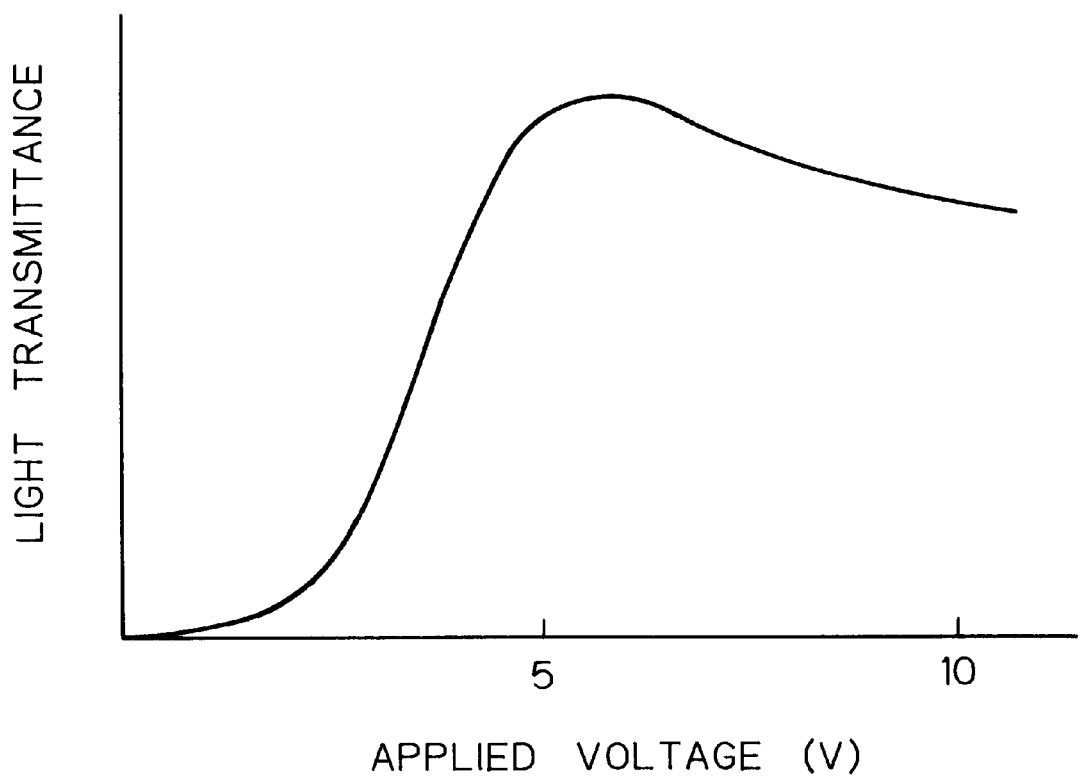
FIG. 5 is a graph showing the voltage-to-light transmittance characteristics of the apparatus of FIG. 1.
Figure 6A:
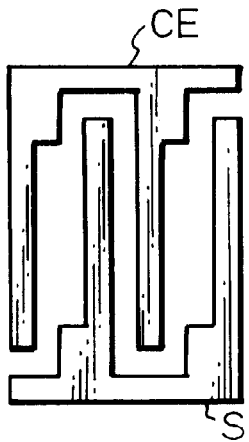
FIGS. 6A through 6H are plan views illustrating a second prior art in-plane type LCD apparatus.
Figure 6B:
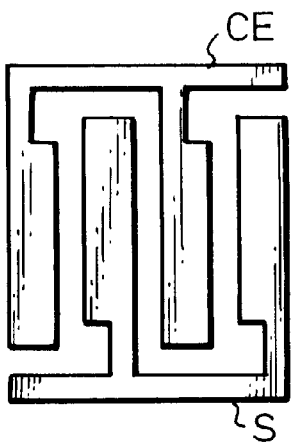
Figure 6C:
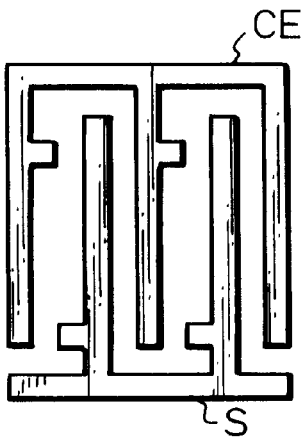
Figure 6D:
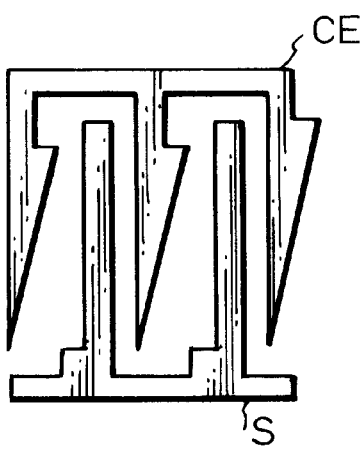
Figure 6E:
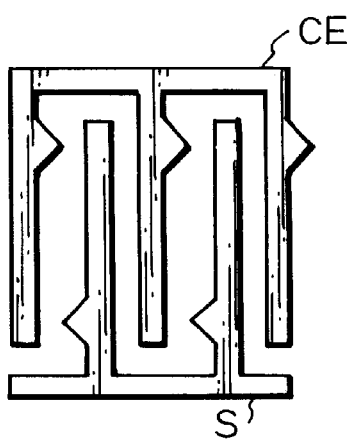
Figure 6F:
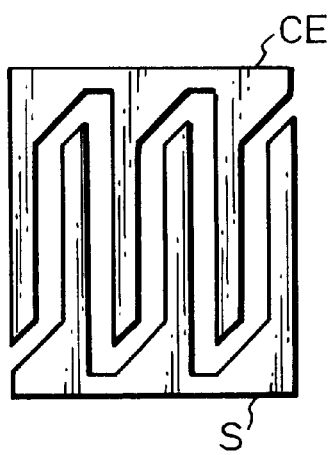
Figure 6G:
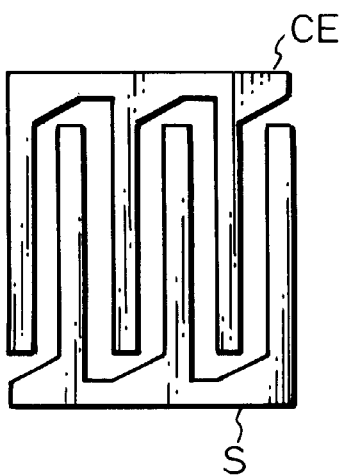
Figure 6H:
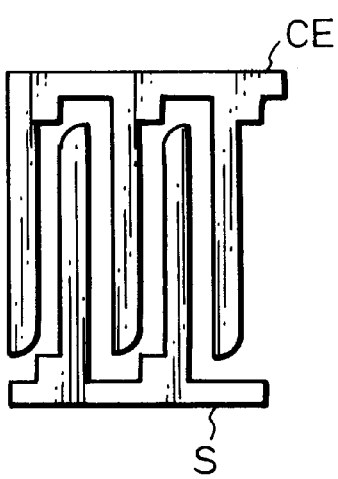

On the other hand, FIG. 5 shows voltage-to-light transmittance characteristics where the width and spacing of the electrodes S and CE are 3 $\mu$m and 10 $\mu$m, respectively; a dielectric anisotropsm $\Delta\epsilon$ of the liquid crystal material is 6.0; and a refractive index anisotropy $\Delta n$ of the liquid crystal material is 0.27. Also, the orientation layers made of polyimide are used to give a pretilt angle of about 2° to 3° by the conventional rubbing process. When the applied voltage becomes higher than 6V, FIG. 6 shows that extraordinary domains are generated. Note that the applied voltage may be 6V or more due to the initial operation of the peripheral circuits or the like. Thus, the extraordinary domains are considered to be easily generated.

In addition, if the voltage applied between the source electrode S and the common electrode CE returns to 0V, the extraordinary domains are retarded; however, thereafter, if a voltage is again applied between the source electrode S and the common electrode CE, the extraordinary domains are further grown eveb more, which further degrades the picture quality. For example, even if the apparatus is in an OFF state for one day or more, the picture quality cannot be recovered.

In FIGS. 6A through 6H, which illustrate a second prior art in-plane type LCD apparatus (see JP-A-7-36058), a part of the source electrode S and a part of the common electrode CE are enlarged to suppress the above-mentioned extraordinary domains. However, the inventors have found that none of the apparatuses as illustrated in FIGS. 6A through 6H have ever showed a reduction of the extraordinary domains.

Figure 7:
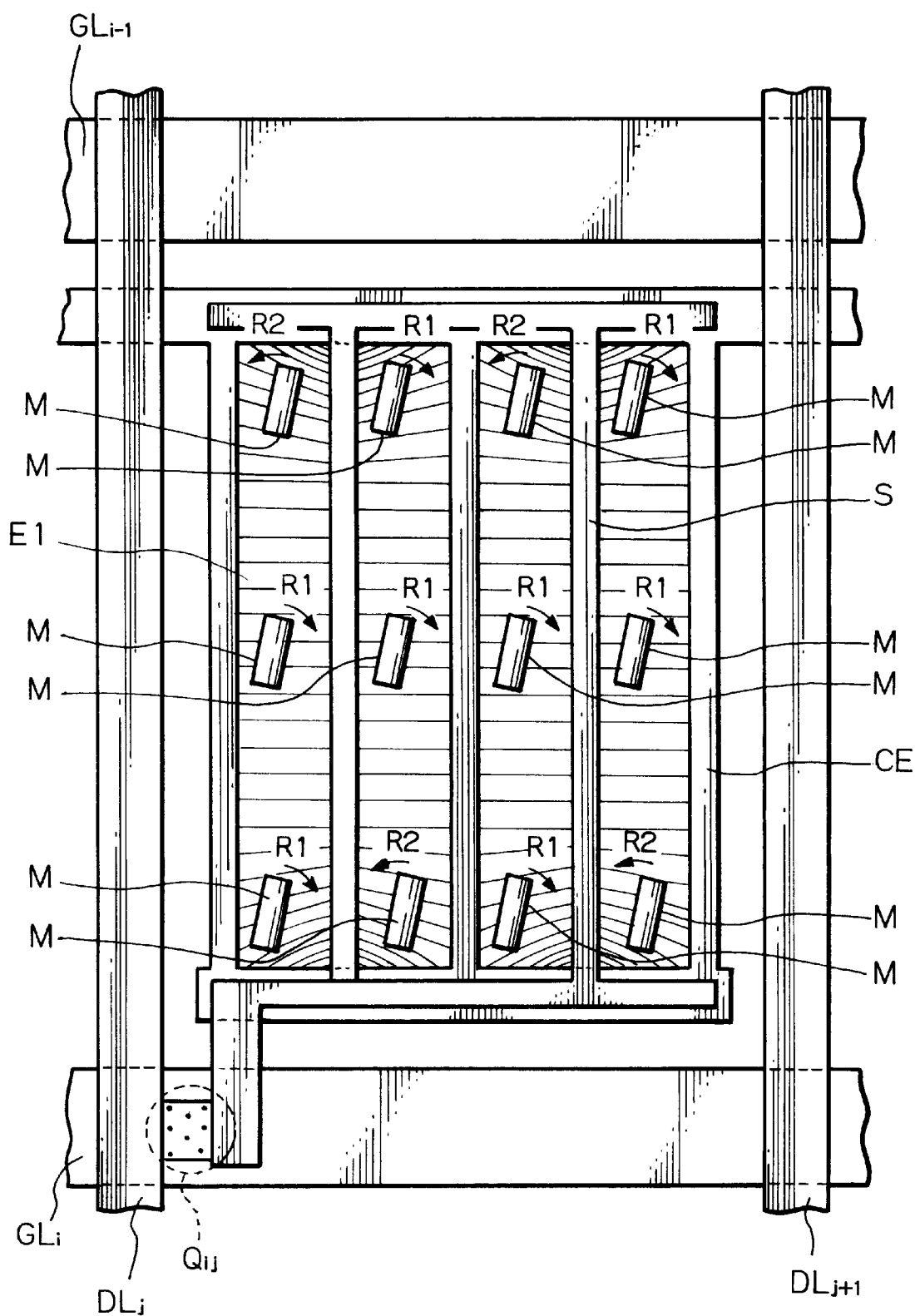
FIG. 7 is a plan view illustrating a third prior art in-plane type LCD apparatus.

In FIG. 7, which illustrates a third prior art in-plane type LCD apparatus (see JP-A-7-36058), a source electrode S and a common electrode CE are both of a ladder type. Also, the source electrode S is isolated from the common electrode CE by an insulating layer (not shown). The source electrode S is partly superposed onto the common electrode CE, to increase the capacitance therebetween. As a result, the numerical apperture can be increased, and the voltage retention characteristics can be improved. In addition, short-circuit and disconnection of the source electrode S and the common electrode CE can be avoided, which increases the manufacturing yield.

Figure 8:
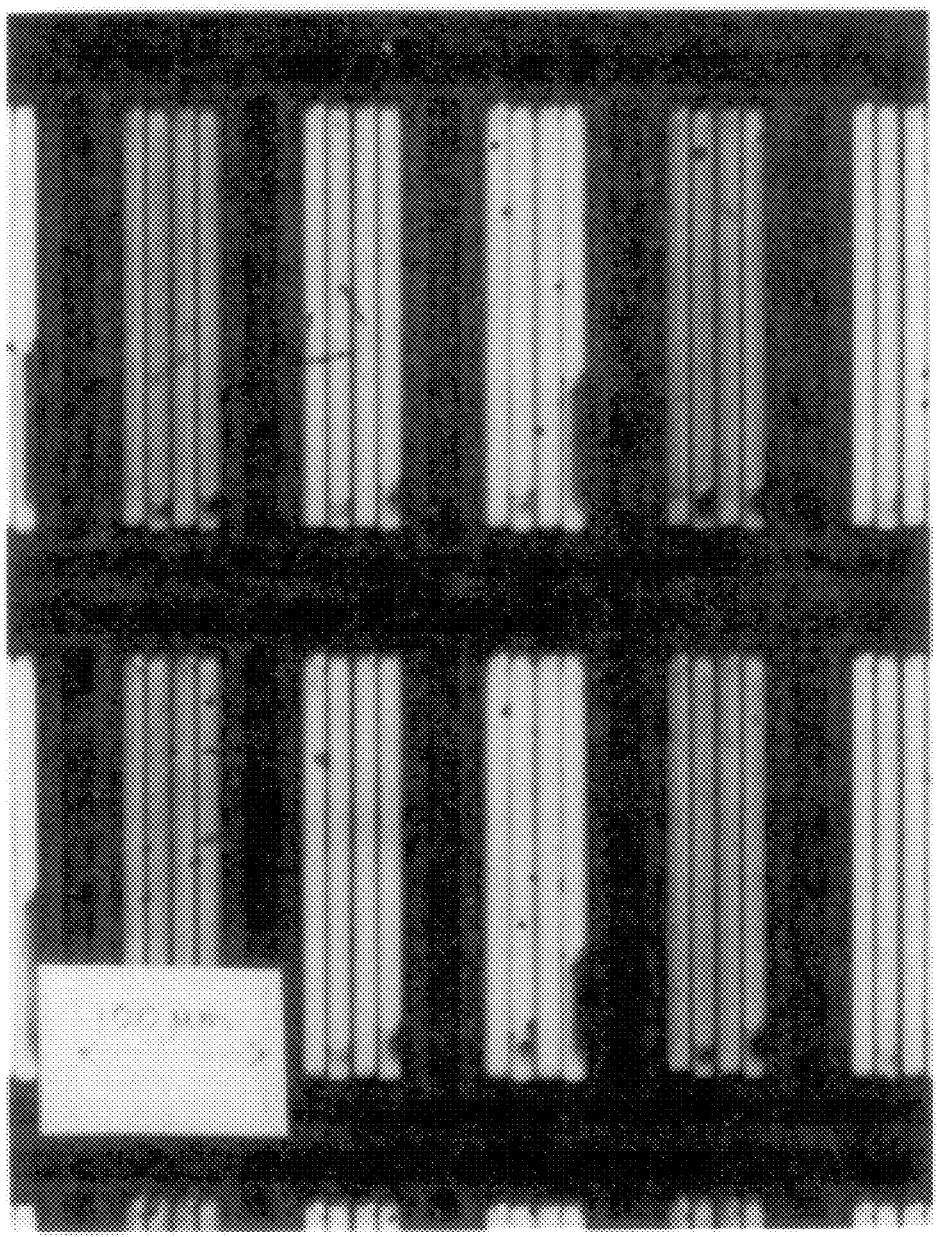
FIG. 8 is a photograph for showing the generation of extraordinary domains in the apparatus of FIG. 7.

Even in the apparatus of FIG. 7, however, electric fields generated around the edged portions of the source electrode S and the common electrode CE are radial. As a result, some of the liquid crystal molecules M are rotated in a counter-clockwise direction as indicated by R2 in FIG. 7, which create extraordinary domains (dark domains) as shown in FIG. 8 where a voltage of 5V is applied between the source electrode S and the common electrode CE. Such extraordinary domains degrade the picture quality. In FIG. 8, note that one square pixel is constructed by three color elements R, G and B.

Also, a fourth prior art in-plane type LCD apparatus improves visible angle characteristics as compared with TN-type LCD apparatuses (see JP-A-5-505247 corresponding to WO 91/10936). However, this fourth prior art in-plane type LCD apparatus has comb-type electrodes to create the above-mentioned extraordinary domains, which degrades the picture quality.

Figure 9:
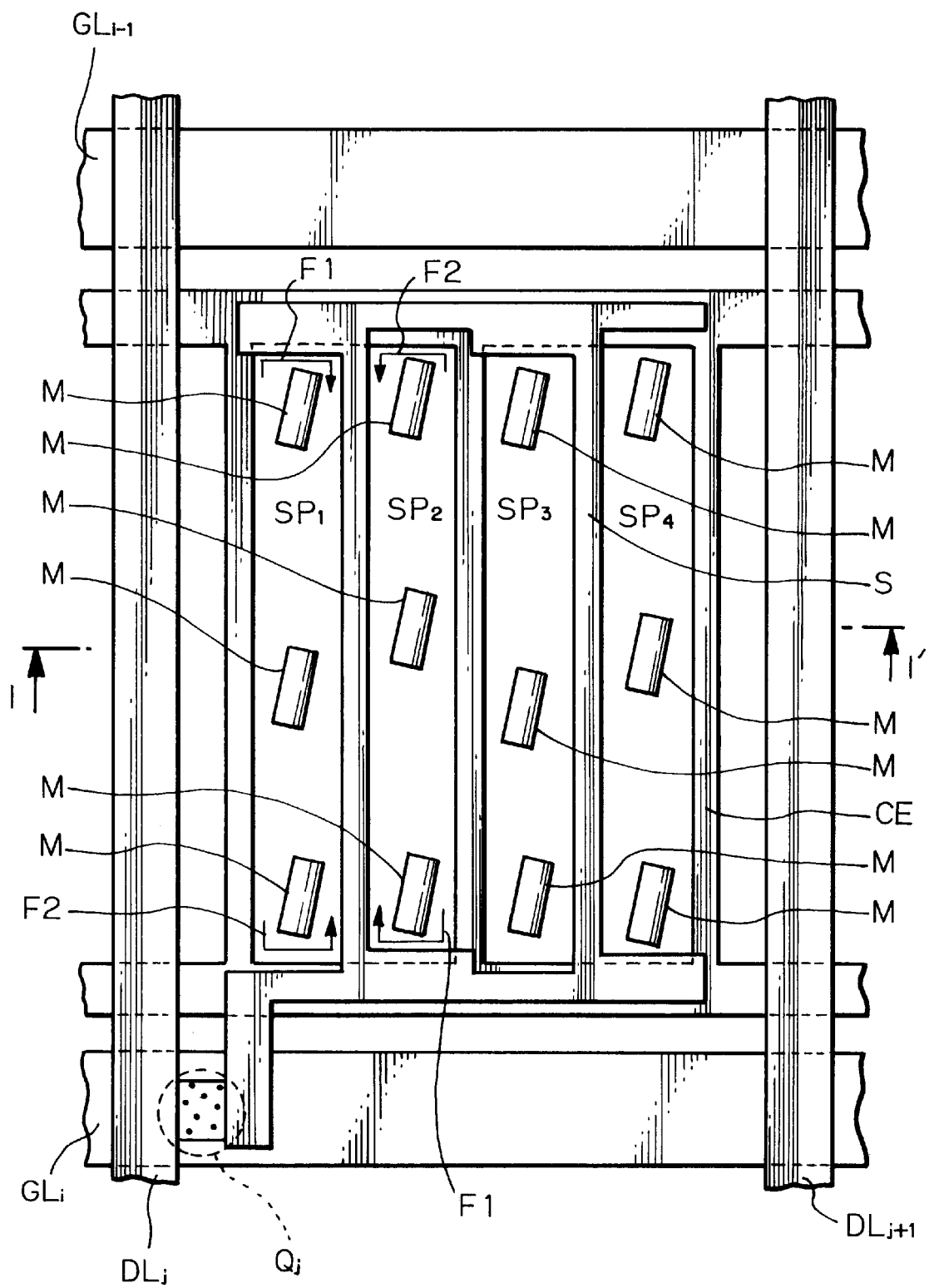
FIG. 9 is a plan view illustrating a first embodiment of the in-plane type LCD apparatus according to the present invention.
Figure 10:
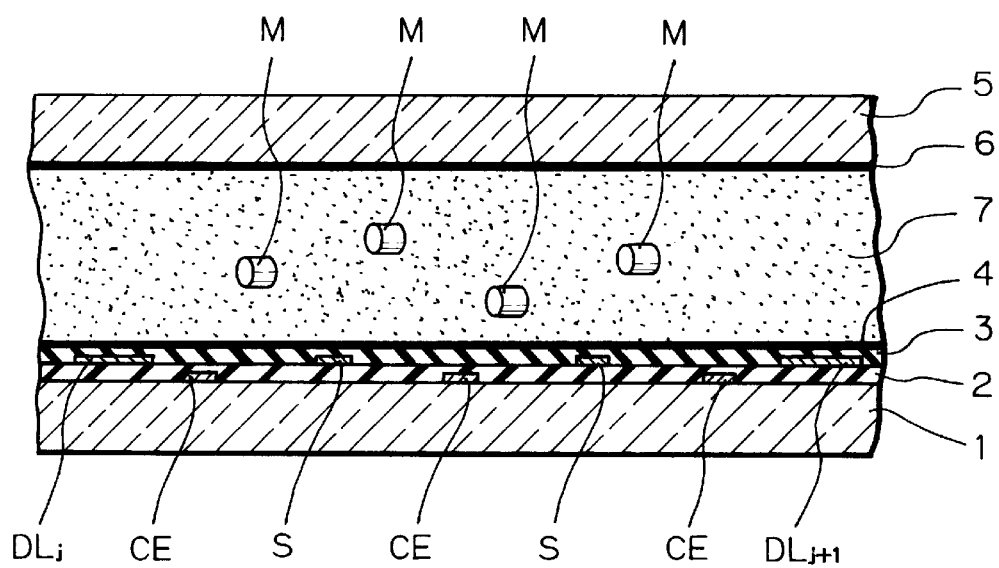
FIG. 10 is a cross-sectional view taken along the line I–I' of FIG. 9.

FIG. 9 is a plan view illustrating a first embodiment of the present invention, and FIG. 10 is a cross-sectional view taken along the line I–I' of FIG. 9.

In FIG. 9, in the same way as in FIG. 7, a source electrode S and a common electrode CE are both of a ladder type. Also, the source electrode S is isolated from the common electrode CE by an insulating layer (not shown). The source electrode S is partly superposed onto the common electrode CE, to increase the capacitance therebetween. As a result, the numerical apperture can be increased, and the voltage retention characteristics can be improved. In addition, short-circuit and disconnection of the source electrode S and the common electrode CE can be avoided, which increases the manufacturing yield.

Also, in FIG. 9, the source electrode S and the common electrode CE divide one pixel area into four sub pixel areas $SP_1$, $SP_2$, $SP_3$ and $SP_4$. In this case, the sub pixel area $SP_1$ is the same as the sub pixel area $SP_3$, and the sub pixel area $SP_2$ is the same as the sub pixel area $SP_4$. That is, in the sub pixel areas $SP_1$ and $SP_3$, the upper and right sides are partitioned by the source electrode S, and the lower and left sides are partitioned by the common electrode CE. In more detail, in the upper portions of the sub pixel areas $SP_1$ and $SP_3$, the edge of the source electrode S is protruded by about 2 μm from the edge of the common electrode CE. Also, in the lower portions of the sub pixel areas $SP_1$ and $SP_3$, the edge of the source electrode S is recessed by about 2 μm from the common electrode CE. On the other hand, in the upper portions of the sub pixel areas $SP_2$ and $SP_4$, the edge of the source electrode S is recessed by about 2 μm from the edge of the common electrode CE. Also, in the lower portions of the sub pixel areas $SP_2$ and $SP_4$, the edge of the source electrode S is protruded by about 2 μm from the common electrode CE. Therefore, if the parallel sides of the common electrode CE is 7 μm wide, the parallel sides of the source electrode S have a 7 μm wide portion and a 3 μm wide portion. In this case, the cross-pieces of the source electrode S and the common electrode CE are 3 μm in width and 15 μm in pitch.

In the upper and lower portions of the pixel areas $SP_1$, $SP_2$, $SP_3$ and $SP_4$, if the sequence of the common electrode CE, an edge and the source electrode S coincides with the rotation direction R1 (see FIG. 11) of the liquid crystal molecules M, the edge is formed by the source electrode S. On the other hand, if the sequence of the common electrode CE, an edge and the source electrode S does not coincide with the rotation direction R1 (see FIG. 11) of the liquid crystal molecules M, the edge is formed by the common electrode CE.

Also, referring to FIG. 10 as well as FIG. 9, the common electrode CE is formed on a glass substrate 1. In this case, the gate bus lines such as $GL_i$ are made of the same material such as $C_r$ as that of the common electrode CE. Also, an insulating layer 2 made of silicon nitride is formed on the common electrode CE and the gate bus lines such as $GL_i$. Further, an amorphous silicon layer (not shown) is formed on a TFT portion of the gate bus line $GL_i$. Further, the drain bus lines such as $DL_j$ and the source electrode S made of Cr are formed on the insulating layer 2. Also, an insulating layer 3 made of silicon nitride is formed on the drain electrode $DL_j$ and the source electrode S. Further, an orientation layer 4 made of insulating organic material is formed on the insulating layer 3.

On the other hand, a counter glass substrate 5 has an orientation layer 6 thereon. Also, striped color filters of red (R), green (G) and blue (B) and a light shielding black matrix are formed on the counter glass substrate 5.

Rubbing operations are performed upon the orientation layers 4 and 5, and a liquid crystal layer 7 of nematic liquid having a refractive anisotropy of 0.067 is inserted between the glass substrates 1 and 5 with the orientation layers 3 and 6 with a gap of about 4.5 μm therebetween. For example, if the dielectric anisotropy characteristic of the liquid crystal layer 7 is positive, the initial orientation angle $\phi_{LC}$ (see FIGS. 2A and 2B) is $$45° \leq \phi_{LC} < 90° \tag{1}$$

Note that, if the dielectric anisotropy characteristic of the liquid crystal layer 7 is negative, the initial orientation angle $\phi_{LC}$ is $$-45° \leq \phi_{LC} < -0°$$

Further, polarization plates (not shown) are adhered on the outer sides of the glass substrates 1 and 5. In this case, the polarization face of one of the polarization plates is perpendicular to that of the other, and coincides with the rubbing direction of the above-mentioned rubbing operations.

In addition, a driving circuit and a backlight are mounted to complete an LCD apparatus of 4096 (=640×3 (R, G, B)×480) pixels.

Note that a size of one pixel is 110 μm×330 μm, for example. Also, the width of the gate bus lines such as $GL_i$ is 16 μm, and the width of the drain bus lines such as $DL_j$ is 8 μm.

The operation of the apparatus of FIGS. 9 and 10 is explained next with reference to FIGS. 11, 12 and 13.

First, when no voltage is applied between the source electrode S and the common electrode CE, the orientation angle of the liquid crystal molecules M is also definite ($=\phi_{LC}$).

Figure 11:
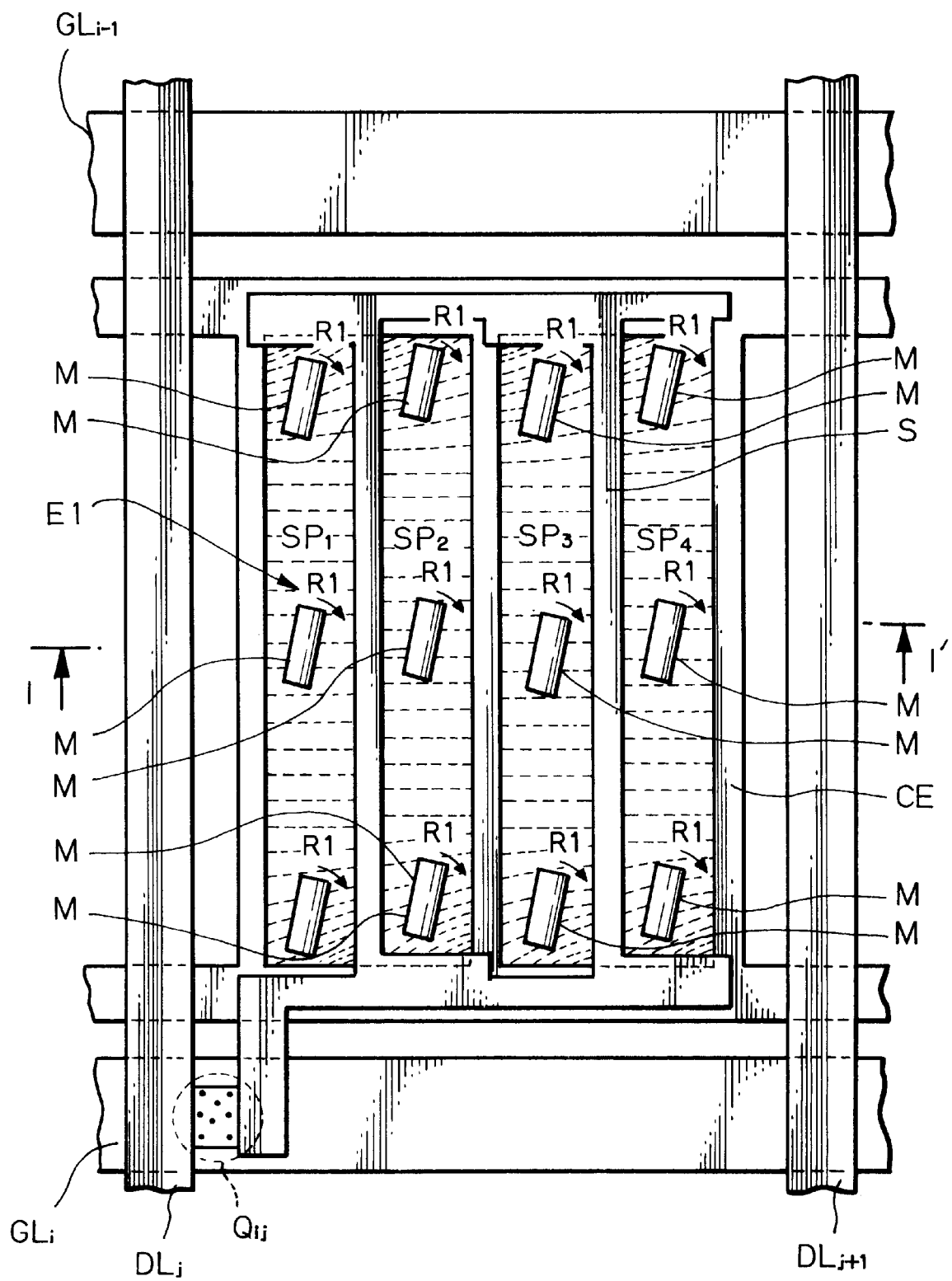
FIG. 11 is a plan view for explaining the operation of the apparatus of FIG. 9.
Figure 12:
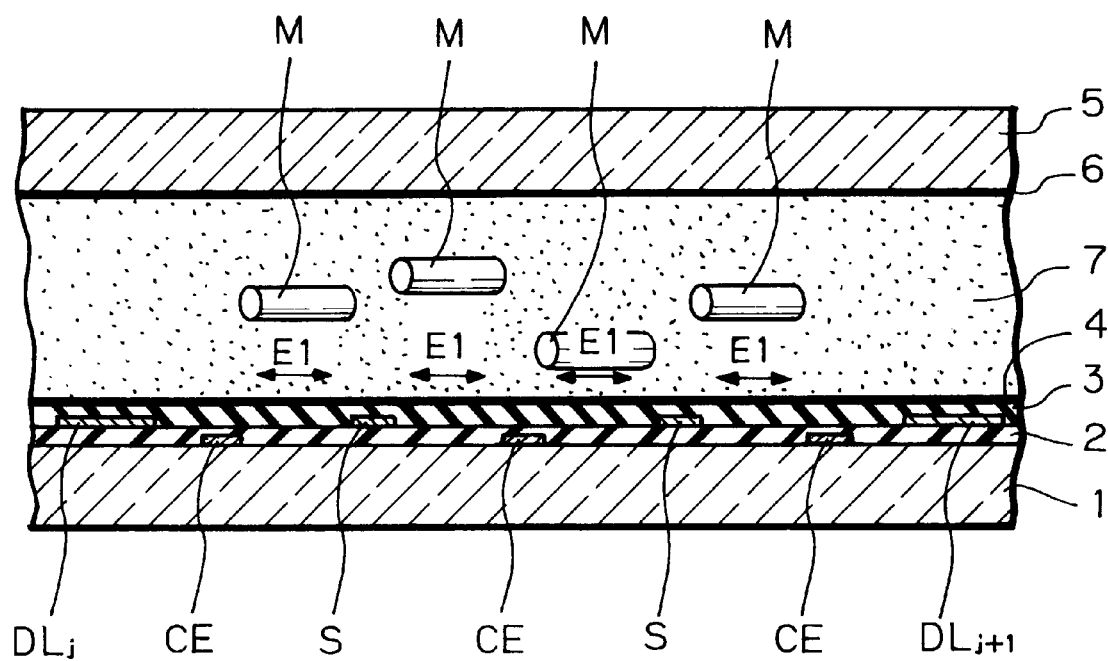
FIG. 12 is a cross-sectional view taken along the line I–I' of FIG. 11.

Next, when a voltage is applied between the source electrode S and the common electrode CE, an electric field E1 are generated between the source electrode S and the common electrode CE as illustrated in FIGS. 11 and 12. That is, an electric field E1 is generated perpendicularly to the source electrode S and the common electrode CE. Aa a result, a torque is applied to the liquid crystal molecules M, so that the liquid crystal molecules M are forced to be in parallel with the electric field E1. In this case, since the liquid crystal molecules M are anchored at the orientation layers of the substrates, only the center portion of the liquid crystal molecules M apart from the substrates are deformed, i.e., twisted.

Figure 13A:
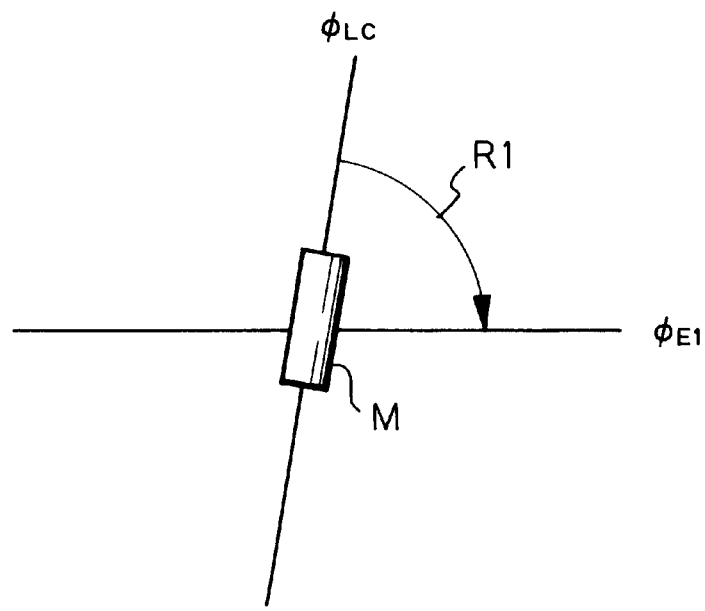
FIGS. 13A and 13B are diagrams for explaining the rotation of the liquid cryatal molecules of FIG. 11.

In the center portion of each of the sub pixel areas $SP_1$, $SP_2$, $SP_3$ and $SP_4$, the angle $\phi_{E^1}$ of the electric field E1 is approximately 0 as shown in FIG. 13A. Therefore, the liquid crystal molecules M of the center portion are rotated in a clockwise direction as indicated by R1 in FIG. 11 as well as in FIG. 13A.

Figure 13B:
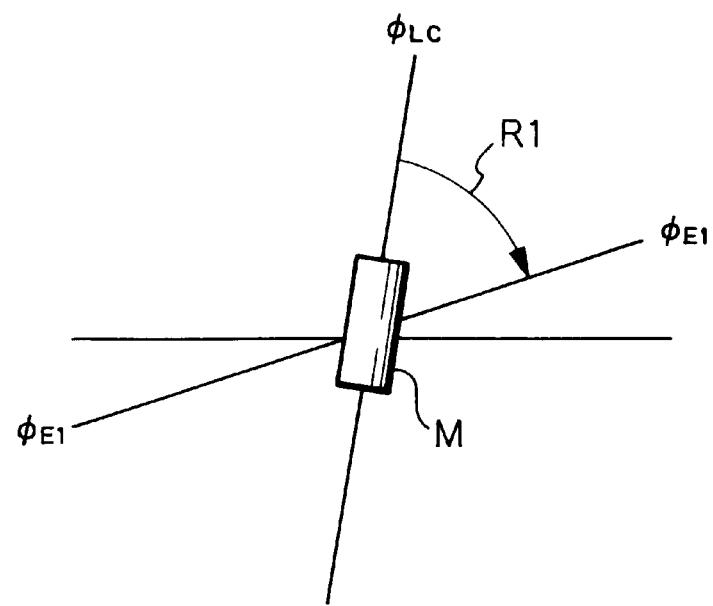

Also, in the top and bottom portions of each of the sub pixel areas $SP_1$, $SP_2$, $SP_3$ and $SP_4$, the angle $\phi_{E^1}$ of the electric field E1 is shown in FIG. 13B, i.e., $$\phi_{LC} - 90° < \phi_{E^1} \leq \phi_{LC} \tag{2}$$

Therefore, the liquid crystal molecules M of the top and bottom portions are also rotated in a clockwise direction as indicated by R1 in FIG. 11 and FIG. 13B.

Thus, in the first embodiment, extraordinary domains (dark domains) are not created, thus improving the picture quality.

Figure 14:
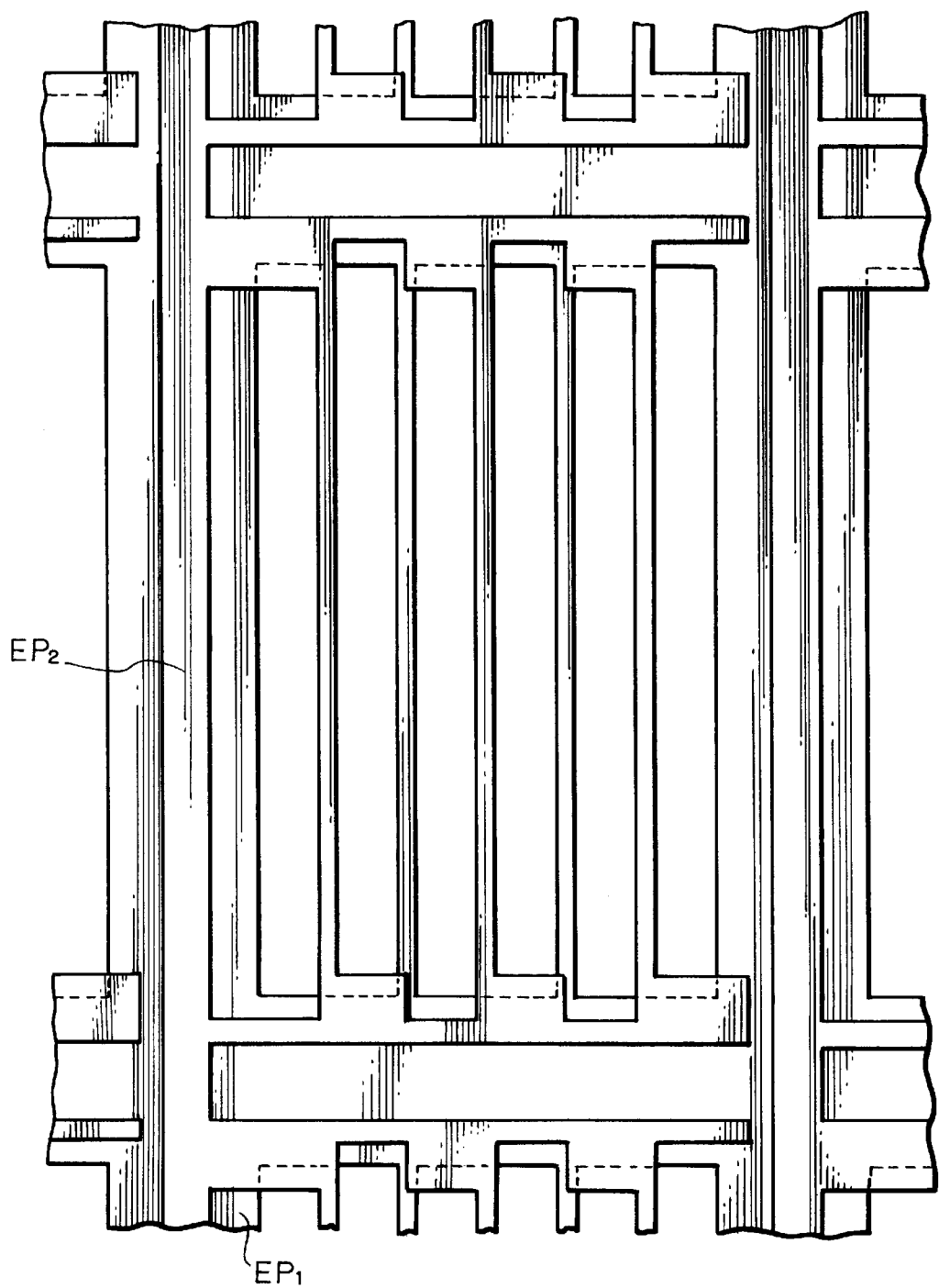
FIG. 14 is a plan view of a simple example of the apparatus of FIG. 9.

The apparatus of the first embodiment is realized by a simple structure as illustrated in FIG. 14, where electrodes $EP_1$ and $EP_2$ made of Cr form the common electrode CE and the source electrode S of FIGS. 11 and 12 whose spacing is 10 μm. In this case, rubbing operations are performed upon orientation layers (not shown) made of polyimide so that the initial orientation angle $\phi_{LC}$ of the liquid crystal molecules M is 75°. Also, a distance between two substrates (not shown) is 4.5 μm. Further, one pixel is divided into six sub pixel areas.

Figure 15:
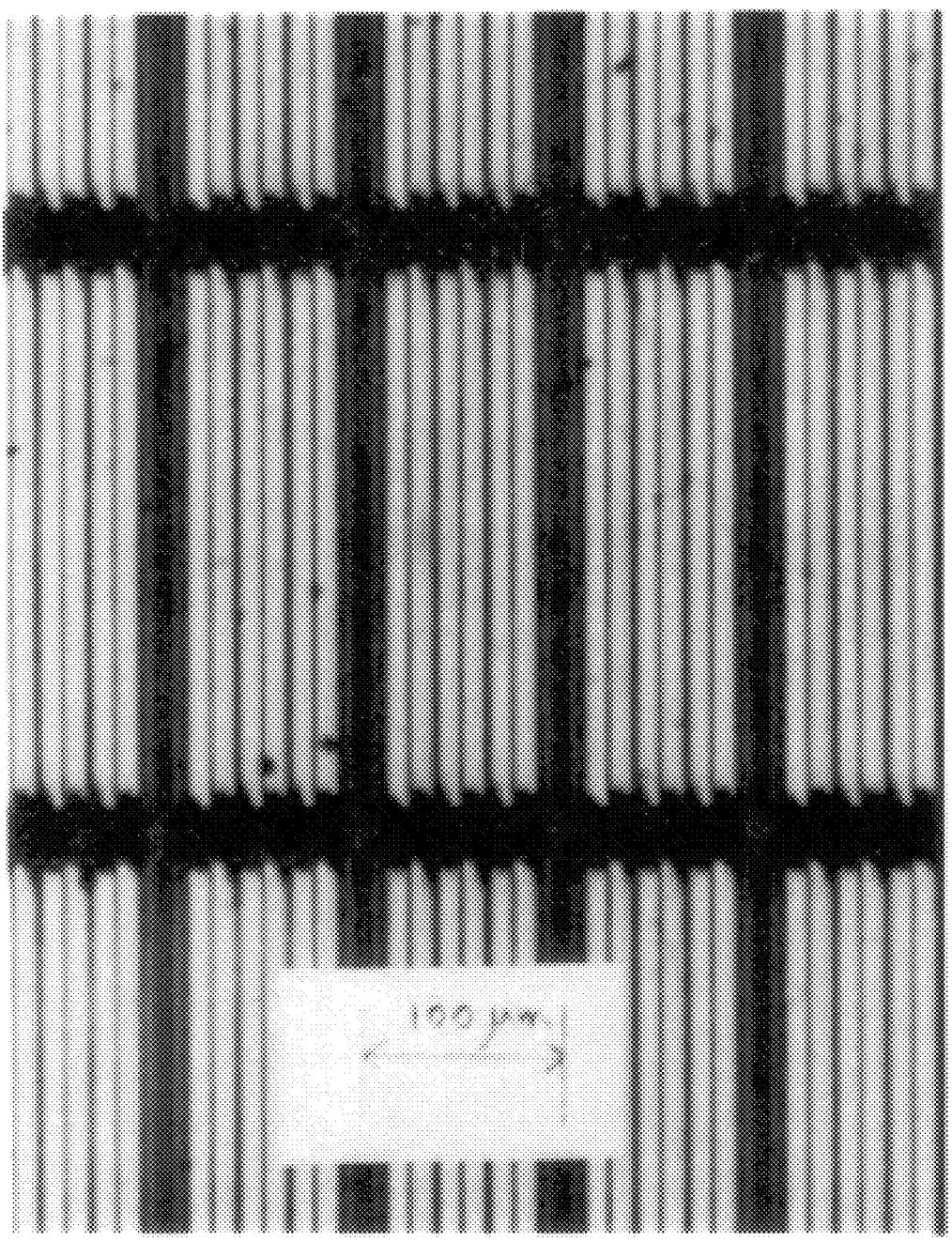
FIG. 15 is a photograph for showing the generation of extraordinary domains in the apparatus of FIG. 14.

When a voltage is applied between the electrodes $EP_1$ and $EP_2$, it has been shown that no extraordinary domains (dark domains) are created as shown in FIG. 15.

Figure 16:
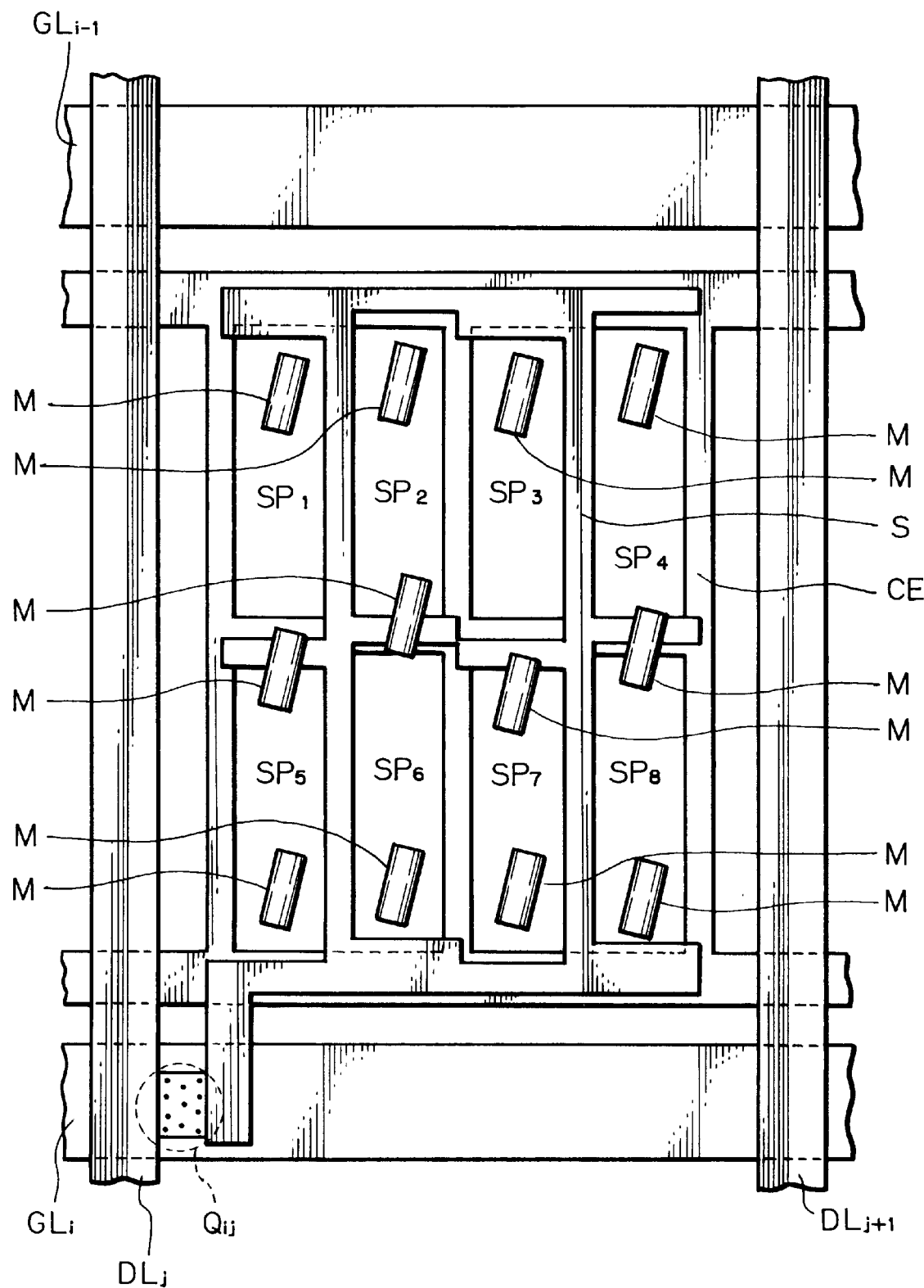
FIG. 16 is a plan view illustrating a second embodiment of the in-plane type LCD apparatus according to the present invention.

In FIG. 16, which illustrates a second embodiment of the present invention, the source electrode S and the common electrode CE divide one pixel area into eight sub pixel areas $SP_1$ through $SP_8$. In this case, the sub pixel areas $SP_1$, $SP_3$, $SP_5$ and $SP_7$ are the same as each other, and the sub pixel area $SP_2$, $SP_4$, $SP_6$ and $SP_8$ are the same as each other. That is, in the sub pixel areas $SP_1$, $SP_3$, $SP_5$ and $SP_8$, the upper and right sides are partitioned by the source electrode S, and the lower and left sides are partitioned by the common electrode CE. In more detail, in the upper portions of the sub pixel areas $SP_1$, $SP_3$, $SP_5$ and $SP_7$, the edge of the source electrode S is protruded by about 2 μm from the edge of the common electrode CE. Also, in the lower portions of the sub pixel areas $SP_1$, $SP_3$, $SP_5$ and $SP_7$, the edge of the source electrode S is recessed by about 2 μm from the common electrode CE. On the other hand, in the upper portions of the sub pixel areas $SP_2$, $SP_4$, $SP_6$ and $SP_8$, the edge of the source electrode S is recessed by about 2 μm from the edge of the common electrode CE. Also, in the lower portions of the sub pixel areas $SP_2$, $SP_4$, $SP_6$ and $SP_8$, the edge of the source electrode S is protruded by about 2 μm from the common electrode CE.

Even in FIG. 16, when a voltage is applied between the source electrode s and the common electrode CE, the liquid crystal molecules M of the top and bottom portions of each sub pixel area are rotated in a clockwise direction in the same way as in the first embodiment. Thus, embodiment, extraordinary domains (dark domains) are not created, thus improving the picture quality.

In addition, in the second embodiment, since the capacitance between the source electrode S and the common electrode CE is increased as compared with the first embodiment, the voltage retention characteristics can be further improved, although the numerical aperture is reduced.

Figure 17:
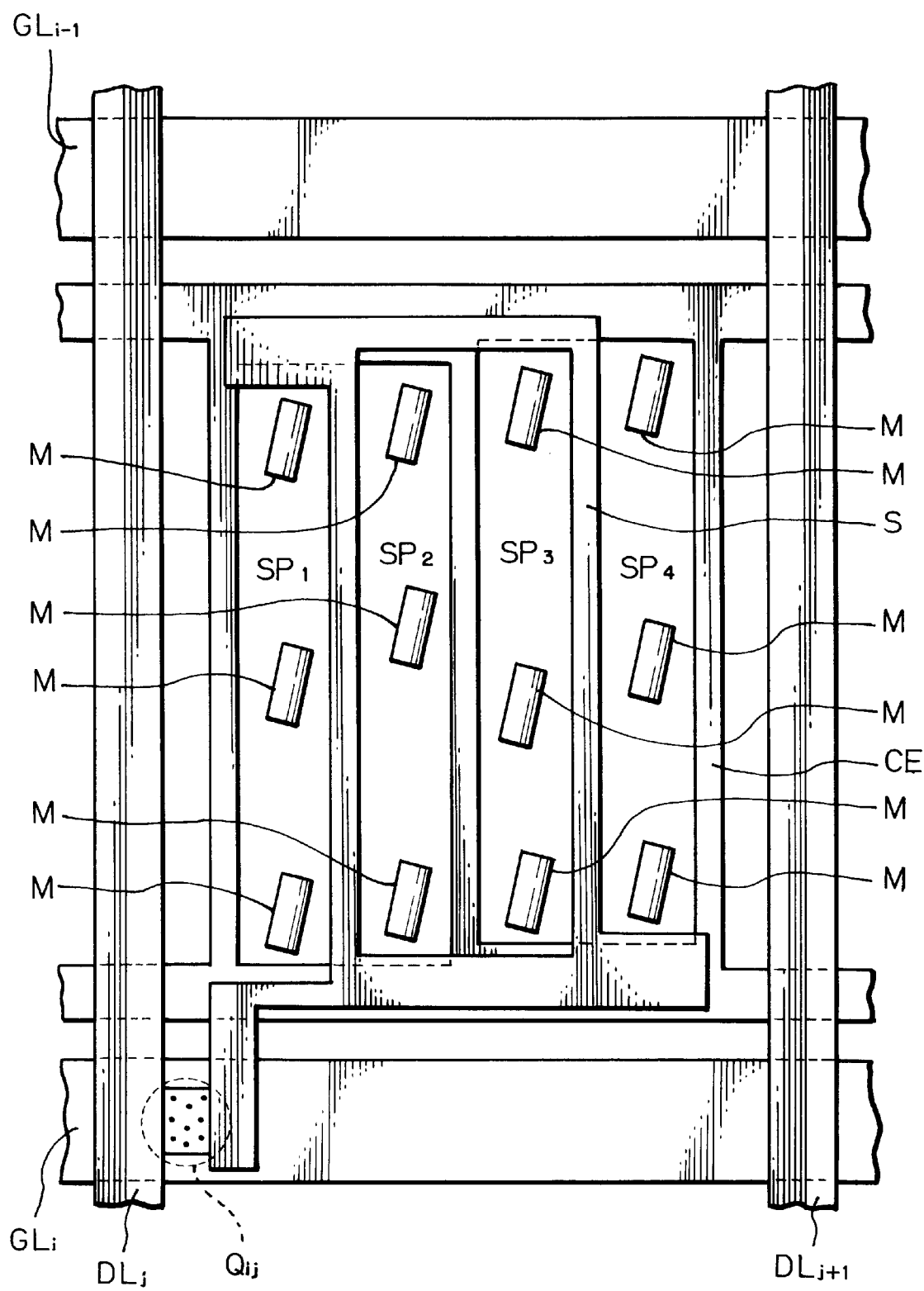
FIG. 17 is a plan view illustrating a third embodiment of the in-plane type LCD apparatus according to the present invention.

In FIG. 17, which illustrates a third embodiment of the present invention, the parallel sides of the common electrode CE and the parallel sides of the source electrode S are alternately stepped. In the first embodiment as illustrated in FIG. 9, note that the parallel sides of the source electrode S is stepped, while the parallel sides of the common electrode CE are not stepped. Therefore, the parallel sides of the source electrode S can be simple. In addition, short-circuit and disconnection of the source electrode S and the common electrode CE can be avoided, which increases the manufacturing yield.

Figure 18:
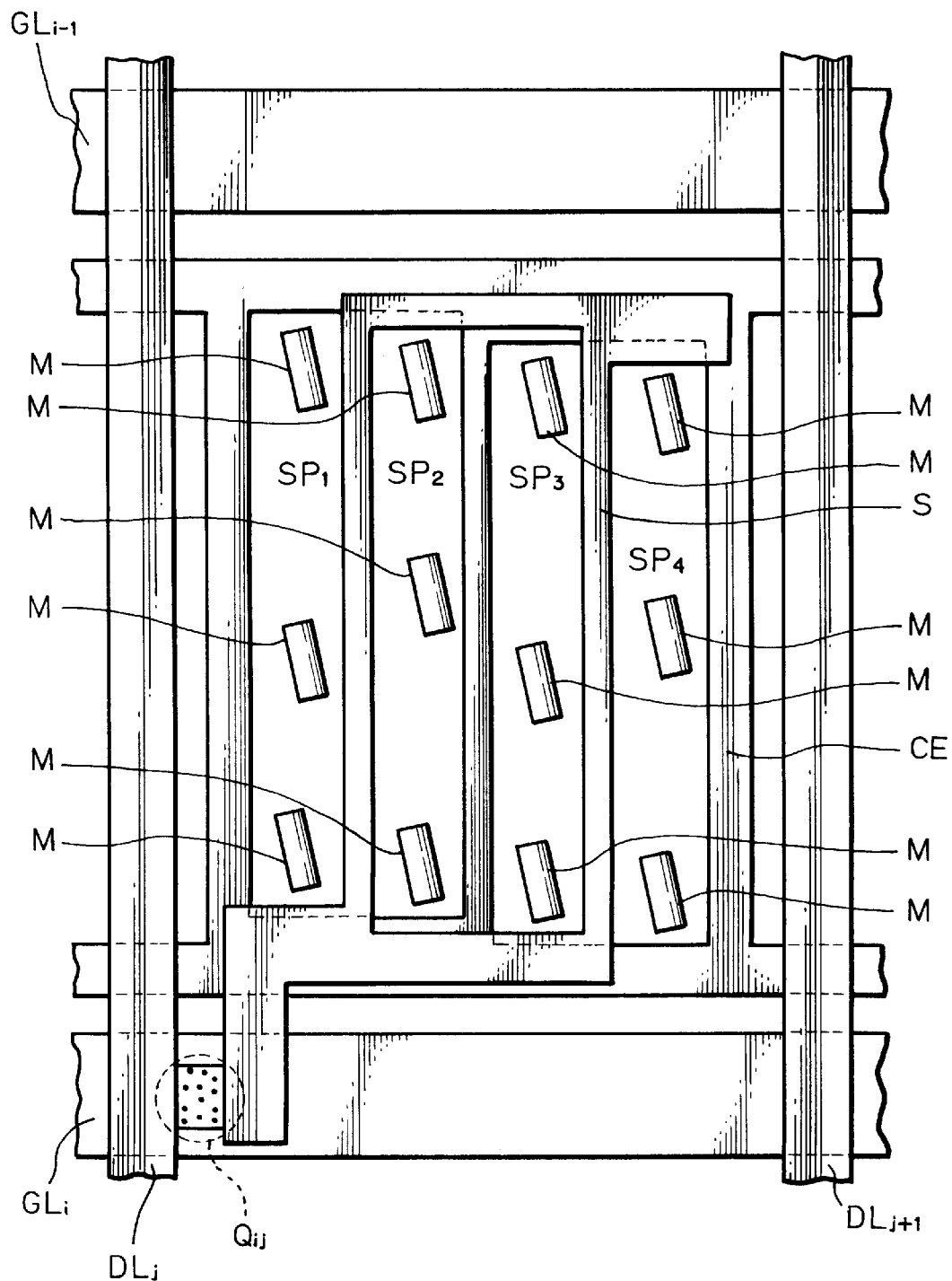
FIG. 18 is a plan view illustrating a fourth embodiment of the in-plane type LCD apparatus according to the present invention.

In FIG. 18, which illustrates a fourth embodiment of the present invention, the apparatus of FIG. 18 is obtained by turning the apparatus of FIG. 17 inside out. As a result, $$-90° < \phi_{LC} \leq -45° \quad (3)$$

is satisfied.

Figure 19A:
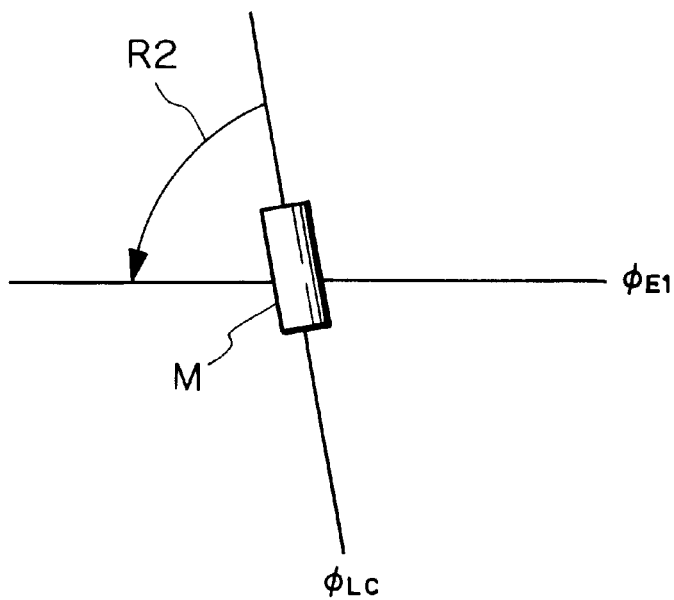
FIGS. 19A and 19B are diagrams for explaining the rotation of the liquid crystal molecules of FIG. 18.

Also, in the center portion of each of the sub pixel areas $SP_1$, $SP_2$, $SP_3$ and $SP_4$, the angle $\phi_{E^1}$ of the electric fieled E1 is approximately 0 as shown in FIG. 19A. Therefore, the liquid crystal molecules M of the center portion are rotated in a counterclockwise direction as indicated by R2 in FIG. 19A. Also, in the top and bottom portions of each of the sub pixel areas $SP_1$, $SP_2$, $SP_3$ and $SP_4$, the angle $\phi_{E^1}$ of the electric field E1 is shown in FIG. 19B, i.e., $$\phi_{LC} < \phi_{E^1} \leq \phi_{LC} + 90° \quad (4)$$

Figure 19B:
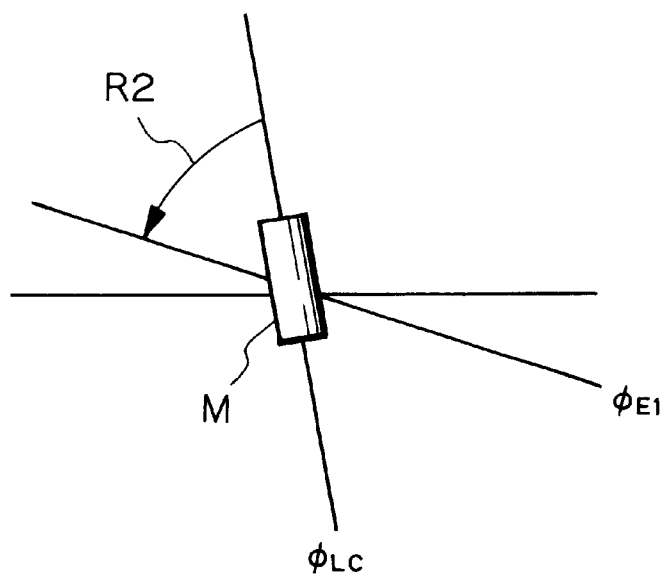

Therefore, the liquid crystal molecules M of the top and bottom portions are also rotated in a counterclockwise direction as indicated by R2 in FIG. 19B.

Thus, in the fourth embodiment, extraordinary domains (dark domains) are not created, thus improving the picture quality.

Note that, if a left half part of one LCD apparatus is formed by pixels as illustrated in FIG. 17 and a right half part of the LCD apparatus is formed by pixels as illustrated in FIG. 18, it is possible to inject liquid crystal between substrates from both sides thereof, which reduces the injection time of liquid crystal. This is helfpul in simplifying the LCD apparatus.

Figure 20:
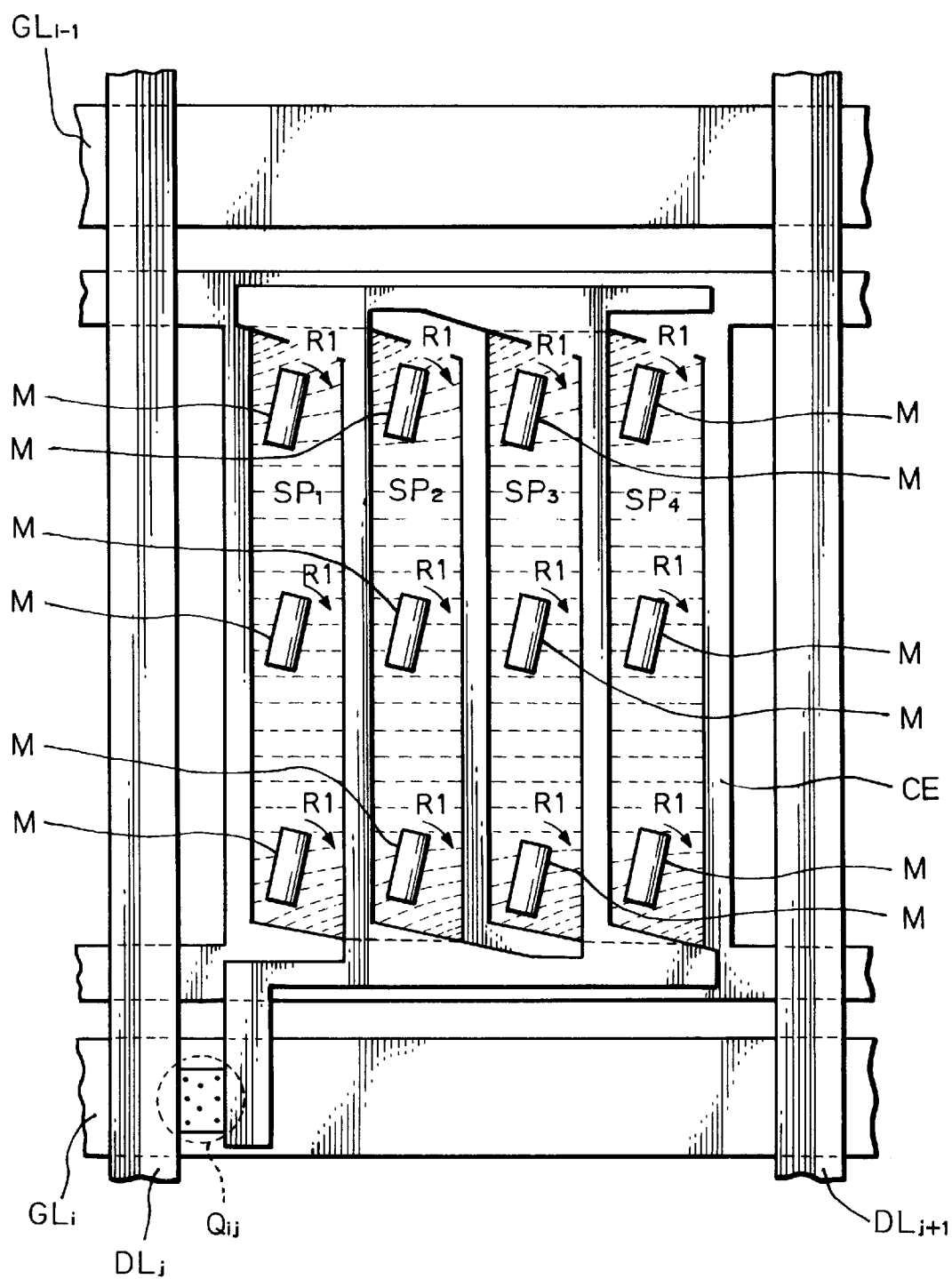
FIG. 20 is a plan view illustrating a fifth embodiment of the in-plane type LCD apparatus according to the present invention.
Figure 21:
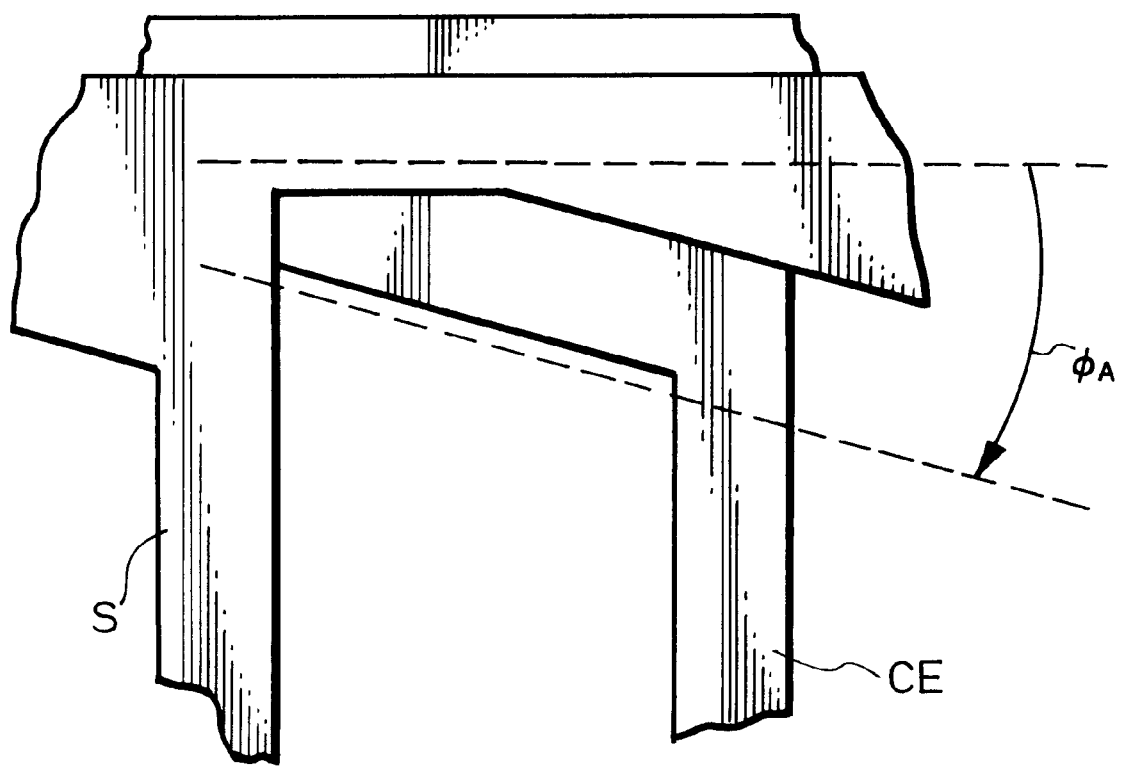
FIG. 21 is a partial enlargement of the apparatus of FIG. 20.
Figure 22:
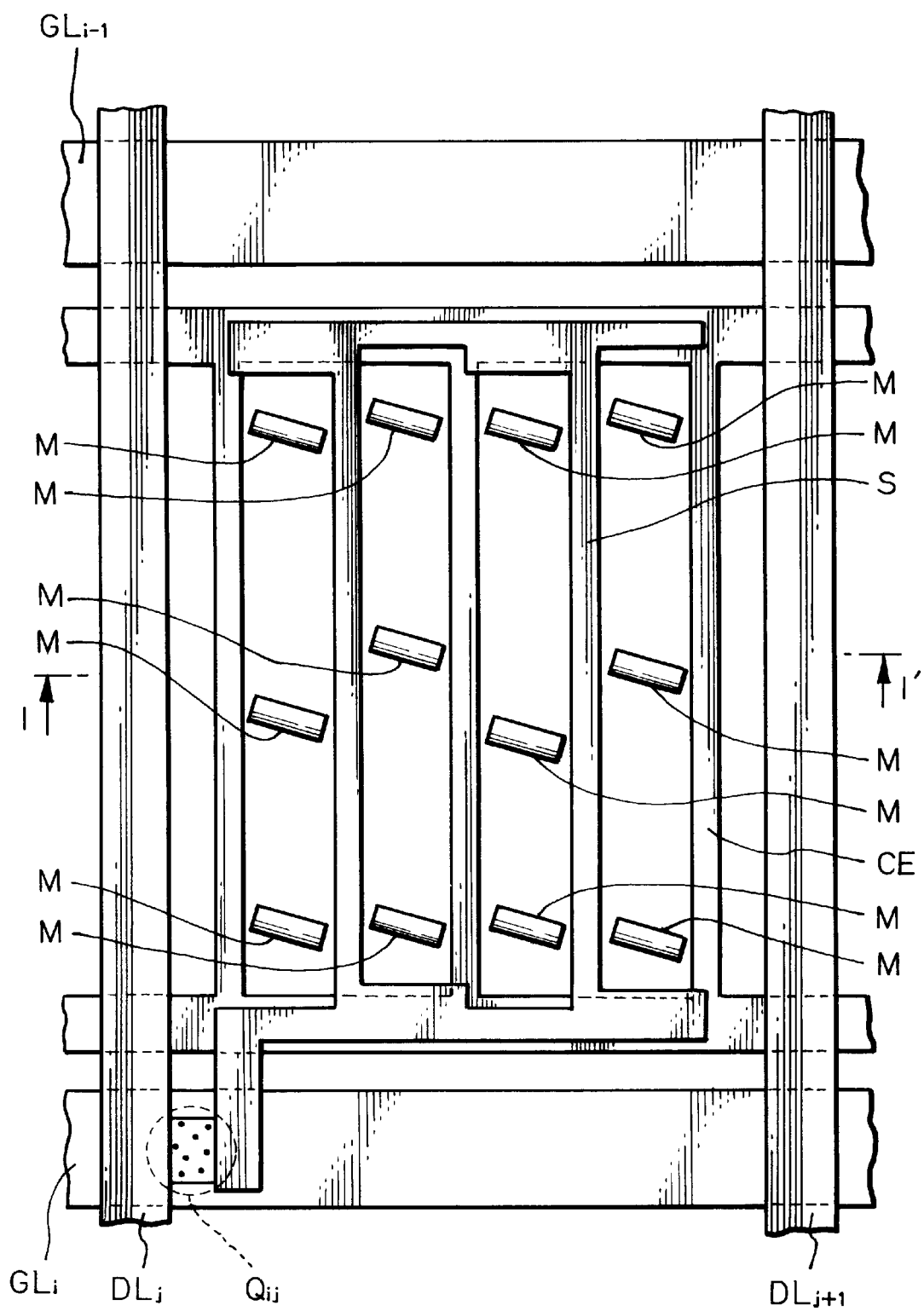
FIG. 22 is a plan view illustrating a modification of the apparatus of FIG. 9.

FIG. 20 is a plan view illustrating a fifth embodiment of the present invention, and FIG. 21 is a partial enlargement of the apparatus of FIG. 20. That is, in the sub pixel areas $SP_1$ and $SP_3$, the upper parallel sides of the source electrode S are sloped, and the lower parallel sides of the common electrode CE are sloped. Also, in the sub pixel areas $SP_2$ and $SP_4$, the upper parallel sides of the common electrode CE are sloped, and the lower parallel sides of the source electrode S are sloped. For example, the sloped angle $\phi_A$ of the parallel sides of the electrodes S and CE as shown in FIG. 21 is $$-90° < \phi_A \leq \phi_{LC} - 90° \quad (5)$$

For example, $\phi_A = -15°$. Note that, if the apparatus of FIG. 20 is applied to the apparatus of FIG. 18, the formula (5) is replaced by $$\phi_{LC} + 90° \leq \phi_A < 90° \quad (6)$$

Due to the sloped parallel sides of the source electrode S and the common electrode CE, the angle $\phi_{E^1}$ of the electric field E1 in the top and bottom portions of each sub pixel area can be smaller than that of the first embodiment as illustrated in FIG. 9. This further suppresses the creation of extraordinary domains (dark domains).

Also, the patterning precision of the source electrode S and the common electrode CE of FIG. 20 can be relaxed as compared with that of the first embodiment as illustrated in FIG. 9, which reduces the manufacturing cost.

Note that the sloped parallel sides of the source electrode S and the common electrode CE can be stepped or curved.

Although the above-mentioned embodiments use liquid crystal having a positive dielectric anisotropy, the present invention can be applied to an LCD apparatus using liquid crystal having a negative dielectric anistopic. In this case, the initial orientation angle of liquid crystal is different by 90° from that in the avove-mentioned embodiments. For example, the first embodiment is modified into an LCD apparatus as illustrated in FIG. 21. In this case, the formulae (1), (2), (3), (4), (5) and (6) are replaced by the following formulae (7), (8), (9), (10'), (11) and (12), respectively:

$$-45° \leq \phi_{LC} < 0° \tag{7}$$

$$\phi_{LC} < \phi_{E^1} \leq \phi_{LC} + 90° \tag{8}$$

$$0° < \phi_{LC} \leq 45° \tag{9}$$

$$\phi_{LC} - 90° \leq \phi_{E^1} < \phi_{LC} \tag{10}$$

$$-90° < \phi_A \leq 0° \tag{11}$$

$$0° \leq \phi_A < 90° \tag{12}$$

As explained hereinabove, according to the present invention, the creation of extraordinary domains can be suppressed to improve the picture quality.

We claim:

1. An in-plane liquid crystal display apparatus comprising:
    a ladder type source electrode having two first parallel sides and a plurality of first cross-pieces between said first parallel sides; and
    a ladder type common electrode having two second parallel sides and a plurality of second cross-pieces between said second parallel sides;
    said ladder type source electrode and said ladder type common electrode defining one pixel area divided into a plurality of sub pixel areas;
    each of said sub pixel areas being partitioned by one of said first parallel sides, one of said first cross-pieces, one of said second parallel sides and one of said second cross-pieces;
    wherein at least one of said first parallel sides and said second parallel sides has a stepped shape.

2. The apparatus as set forth in claim 1, wherein a sequence of said one of said first parallel sides, said one of said first cross-pieces, said one of said second parallel sides and said one of said second cross-pieces in each of said sub pixel areas is dependent upon a rotation direction of liquid crystal within each of said sub pixel areas.

3. The apparatus as set forth in claim 1, wherein, when liquid crystal inserted into said apparatus has a positive dielectric anisotropism, the following conditions are satisfied in each of said sub pixel areas:

$$45° \leq \phi_{LC} < 90°$$

$$\phi_{LC} - 90° < \phi_{E^1} \leq \phi_{LC}$$

where $\phi_{LC}$ is an initial orientation angle of said liquid crystal with respect to a direction perpendicular to said first and second cross-pieces, and $\phi_{E^1}$ is a direction of an electric field applied by said ladder type source and said ladder type common electrode with respect to said direction.

4. The apparatus as set forth in claim 1, wherein, when liquid crystal inserted into said apparatus has a positive dielectric anisotropy, the following conditions are satisfied in each of said sub pixel areas:

$$-90° < \phi_{LC} < -45°$$

$$\phi_{LC} \leq \phi_{E^1} < \phi_{LC} + 90°$$

where $\phi_{LC}$ is an initial orientation angle of said liquid crystal with respect to a direction perpendicular to said first and second cross-pieces, and $\phi_{E^1}$ is a direction of an electric field applied by said ladder type source and said ladder type common electrode with respect to said direction.

5. The apparatus as set forth in claim 1, wherein, when liquid crystal inserted into said apparatus has a negative dielectric anisotropy, the following conditions are satisfied in each of said sub pixel areas:

$$-45° \leq \phi_{LC} 21\ 0°$$

$$\phi_{LC} < \phi_{E^1} \leq \phi_{LC} + 90°$$

where $\phi_{LC}$ is an initial orientation angle of said liquid crystal with respect to a direction perpendicular to said first and second cross-pieces, and $\phi_{E^1}$ is a direction of an electric field applied by said ladder type source and said ladder type common electrode with respect to said direction.

6. The apparatus as set forth in claim 1, wherein, when liquid crystal inserted into said apparatus has a regative dielectric anisotropy, the following conditions are satisfied in each of said sub pixel areas:

$$0° < \phi_{LC} \leq 45°$$

$$\phi_{LC} - 90° \leq \phi_{E^1} < \phi_{LC}$$

where $\phi_{LC}$ is an initial orientation angle of said liquid crystal with respect to a direction perpendicular to said first and second cross-pieces, and $\phi_{E^1}$ is a direction of an electric field applied by said ladder type source and said ladder type common electrode with respect to said direction.

7. The apparatus as set forth in claim 1, wherein said first parallel sides are superposed on said second parallel sides,
    said first parallel sides being stepped;
    said second parallel sides being straight.

8. The apparatus as set forth in claim 1, wherein said first parallel sides are superposed on said second parallel sides,
    said first parallel sides being stepped;
    said second parallel sides being stepped.

9. An in-plane liquid crystal display apparatus, comprising:
    a ladder type source electrode having two first parallel sides and a plurality of first cross-pieces between said first parallel sides; and
    a ladder type common electrode having two second parallel sides and a plurality of second cross-pieces between said second parallel sides;
    said ladder type source electrode and said ladder type common electrode defining one pixel area divided into a plurality of sub pixel areas;
    each of said sub pixel areas being partitioned by one of said first parallel sides, one of said first cross-pieces, one of said second parallel sides and one of said second cross-pieces;
    wherein said first and second parallel sides have sloped edges.

10. The apparatus as set forth in claim 9, wherein, when liquid crystal inserted into said apparatus has a positive dielectric anisotropy, the following conditions are satisfied in each of said sub pixel areas:

$$45° \leq \phi_{LC} < 90°$$

$$-90° < \phi_A \leq \phi_{LC} - 90°$$

where $\phi_{L\ C}$ is an initial orientation angle of said liquid crystal with respect to a direction perpendicular to said first and second cross-pieces, and $\phi_A$ is a sloped angle of said edges of said first and second parallel sides with respect to said direction.

11. The apparatus as set forth in claim 9, wherein, when liquid crystal inserted into said apparatus has a positive dielectic anisotropy, the following conditions are satisfied in each of said sub pixel areas:

$$-90° < \phi_{LC} \leq -45°$$

$$\phi_{LC} + 90° \leq \phi_A < 90°$$

where $\phi_{LC}$ is an initial orientation angle of said liquid crystal with respect to a direction perpendicular to said first and second cross-pieces, and $\phi_A$ is a sloped angle of said edges of said first and second parallel sides with respect to said direction.

12. The apparatus as set forth in claim 9, wherein, when liquid crystal inserted into said apparatus has a negative dielectic anisotropy, the following conditions are satisfied in each of said sub pixel areas:

$$45° \leq \phi_{LC} < 90°$$

$$-90° < \phi_A \leq 0°$$

where $\phi_{LC}$ is an initial orientation angle of said liquid crystal with respect to a direction perpendicular to said first and second cross-pieces, and $\phi_A$ is a sloped angle of said edges of said first and second parallel sides with respect to said direction.

13. The apparatus as set forth in claim 9, wherein, when liquid crystal inserted into said apparatus has a negative dielectic anisotropy, the following conditions are satisfied in each of said sub pixel areas:

$$-90° < \phi_{LC} \leq -45°$$

$$0° \leq \phi_A < 90°$$

where $\phi_{LC}$ is an initial orientation angle of said liquid crystal with respect to a direction perpendicular to said first and second cross-pieces, and $\phi_A$ is a sloped angle of said edges of said first and second parallel sides with respect to said direction.

* * * * *

UNITED STATES PATENT AND TRADEMARK OFFICE
CERTIFICATE OF CORRECTION

PATENT NO. : 5,905,556
DATED : May 18, 1999
INVENTOR(S) : Teruaki SUZUKI, et al.

It is certified that error appears in the above-identified patent and that said Letters Patent is hereby corrected as shown below:

Column 10, line 5, delete "21" and insert --<--.

Signed and Sealed this

Twenty-fifth Day of January, 2000

Attest:

Attesting Officer

Acting Commissioner of Patents and Trademarks